United States Patent
Nagayama et al.

(10) Patent No.: US 6,560,182 B1
(45) Date of Patent: May 6, 2003

(54) OPTICAL RECORDING METHOD

(75) Inventors: Mori Nagayama, Tokyo (JP); Hiroyasu Inoue, Tokyo (JP); Jiro Yoshinari, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/559,360

(22) Filed: Apr. 27, 2000

(30) Foreign Application Priority Data

May 10, 1999 (JP) .......................................... 11-128460

(51) Int. Cl.$^7$ ................................................. G11B 7/00
(52) U.S. Cl. ................................................... 369/59.12
(58) Field of Search ........................... 369/13.25, 13.54, 369/47.28, 53.19, 59.1, 59.11, 59.12, 275.1

(56) References Cited

FOREIGN PATENT DOCUMENTS

| JP | 2-165420 | 6/1990 |
|----|----------|--------|
| JP | 3-283021 | 12/1991 |
| JP | 5-062193 | 3/1993 |
| JP | 6-012674 | 1/1994 |
| JP | 6-295440 | 10/1994 |
| JP | 8-235587 | 9/1996 |
| JP | 8-235588 | 9/1996 |
| JP | 9-138947 | 5/1997 |

*Primary Examiner*—Thang V. Tran
*Assistant Examiner*—Bach Vuong
(74) *Attorney, Agent, or Firm*—Oblon, Spivak, McClelland, Maier & Neustadt, P.C.

(57) ABSTRACT

In overwriting in an optical recording medium of phase change type at a high linear velocity, an increase in jitter is prevented without increase a laser power, by an optical recording method using a pulse train having at least 1 unit pulse of an upward pulse and a downward pulse continued therefrom as a recording waveform for optical beam modulation. In the pulse train having unit pulses in the number of n (n≧4), when values obtained by normalizing upward pulse duration and downward pulse duration of a unit pulse in a position i counted from a first unit pulse of the pulse train on the basis of a base clock width are $T(i)_H$ and $T(i)_L$, $T(2)_H$ to $T(n-1)_H = Tmp_H$ and $T(2)_L$ to $T(n-2)_L = Tmp_L$, and a first embodiment employs $0 < T(1)_L < Tmp_L$, a second embodiment employs $0 \leq T(n)_L < Tmp_L$ and $Tmp_H < T(n)_H \leq Tmp_H + 0.3$, and a third embodiment employs $0 \leq T(n)_L < Tmp_L$ and $0.1 \leq T(n-1)_L < Tmp_L$.

6 Claims, 1 Drawing Sheet

OPTICAL RECORDING METHOD

BACKGROUND OF THE INVENTION

1. Field of the Invention

The present invention relates to a method for recording information in an optical recording medium of phase change type.

2. Prior Art

In recent years, highlighted are optical recording media which permit recording at a high density and erasing recorded information for overwriting. The "overwritable" optical recording media includes an optical recording medium of phase change type, in which information is recorded by changing the crystalline state of a recording layer with a laser beam and the information is read by detecting a change in reflectance which the recording layer shows due to a change in state.

The optical recording medium of phase change type is of great interest, since overwriting can be made by modulating the intensity of a single laser beam and since the optical system of a drive unit therefor is simple.

When information is recorded in the optical recording medium of phase change type, a laser beam having a power (recording power) to increase the temperature of the recording layer to a melting point thereof or higher is applied to the recording layer. In a region where the recording power is applied, the recording layer is melted and then quenched to form an amorphous record mark. For erasing the record mark, the region of the record mark is irradiated with a laser beam having a power (erasing power) to increase the temperature of the recording layer to a temperature equal to, or higher than, a crystallization temperature thereof but lower than the melting point. When the erasing power is applied to the record mark, the record mark is heated to the crystallization temperature or higher and then allowed to cool gradually, to recover the crystalline state. Modulating the intensity of the single laser beam therefore enables the overwriting.

The method of forming the record mark generally includes two methods; one is a mark position recording method in which information is marked in only a position where a record mark is formed, and the other is a mark edge recording method in which information is marked in two edges of a record mark. The mark edge recording method is essential for high-density recording since it can double the recording density in the mark position recording method.

In the mark edge recording method, positions of the two edges are of significance, so that it is essential to form an accurate record mark. For this reason, the main stream is that a laser beam for recording is applied like pulses. When a laser beam is applied like pulses, the accumulation of heat in an applied region is prevented, and lengthening of the record mark caused by enlargement of the trailing edge of the record mark can be prevented.

As a conventional method of pulse-like application, for example, there is a method in which laser powers are switched between a high power and a low power at predetermined period intervals for a length of time corresponding to, or smaller than, the length of the record mark. In this method, the recording layer is quenched after application of a high power, so that an amorphous state is easily formed. This method is described, for example, in JP-A-8-235588, JP-A-3-283021 and JP-A-2-165420.

There is also proposed a method in which the duration of the first pulse is made to be larger than the duration of any other pulse. This method is described, for example, in JP-A-9-138947, JP-A-8-235587, JP-A-6-12674, JP-A-6-295440 and JP-A-5-62193.

There is also proposed a method in which, for cooling, a laser beam having a power lower than the erasing power is applied before a first pulse and/or after a last pulse. This method is described, for example, in the above JP-A-9-138947 and the above JP-A-6-295440.

According to studies made by the present inventors, however, the following has been found. Even if a recording waveform is made to correspond to a pulse train and if the duration of each pulse is controlled as described in the above Japanese patent gazettes, jitter cannot be fully decreased when a linear velocity is increased. When the linear velocity is increased, the jitter can be decreased by increasing the power of a laser beam. Since, however, a high-power semiconductor laser is difficult to make and is very expensive, it cannot be applied to commercial-based machines and equipment.

SUMMARY OF THE INVENTION

Under the circumstances, an object of the present invention is to prevent an increase in jitter without increasing the power of a laser beam when overwriting is made in an optical recording medium of phase change type at a high linear velocity.

The above object is achieved by the following embodiments (1) to (6) according to the present invention.

(1) An optical recording method using a pulse train having at least 1 unit pulse of an upward pulse and a downward pulse continued therefrom as a recording waveform for optical beam modulation in forming 1 record mark by overwriting in an optical recording medium having a recording layer of a phase change type on a substrate, the pulse train including a pulse train having unit pulses of which the number is n (n≧4), the optical recording method satisfying;

$T(i)_H = Tmp_H$ (constant value) when $2 \leq i \leq n-1$, $T(i)_L = Tmp_L$ (constant value) when $2 \leq i \leq n-2$, and $0 < T(1)_L < Tmp_L$ wherein $T(i)_H$ and $T(i)_L$ are values obtained by normalizing upward pulse duration and downward pulse duration of a unit pulse in a position i counted from a first unit pulse of the included pulse train on the basis of a base clock width.

(2) An optical recording method according to the above (1), wherein the overwriting is effected at a linear velocity of at least 3.5 m/s of the optical recording medium.

(3) An optical recording method using a pulse train having at least 1 unit pulse of an upward pulse and a downward pulse continued therefrom as a recording waveform for optical beam modulation in forming 1 record mark by overwriting in an optical recording medium having a recording layer of a phase change type on a substrate, the pulse train including a pulse train having unit pulses of which the number is n (n≧4), the optical recording method satisfying;

$T(i)_H = Tmp_H$ (constant value) when $2 \leq i \leq n-1$, $T(i)_L = Tmp_L$ (constant value) when $2 \leq i \leq n-2$, $0 \leq T(n)_L < Tmp_L$, and $$Tmp_H < T(n)_H \leq Tmp_H + 0.3$$

wherein $T(i)_H$ and $T(i)_L$ are values obtained by normalizing upward pulse duration and downward pulse duration of a unit pulse in a position i counted from a first unit pulse of the included pulse train on the basis of a base clock width.

(4) An optical recording method according to the above (3), wherein the overwriting is effected at a linear velocity of at least 3.5 m/s of the optical recording medium.

(5) An optical recording method using a pulse train having at least 1 unit pulse of an upward pulse and a downward pulse continued therefrom as a recording waveform for optical beam modulation in forming 1 record mark by overwriting in an optical recording medium having a recording layer of a phase change type on a substrate, the pulse train including a pulse train having unit pulses of which the number is n ($n \geq 4$), the optical recording method satisfying;

$$T(i)_H = Tmp_H \text{ (constant value) when } 2 \leq i \leq n-1,$$

$$T(i)_L = Tmp_L \text{ (constant value) when } 2 \leq i \leq n-2,$$

$$0 \leq T(n)_L < Tmp_L,$$

and $$0.1 \leq T(n-1)_L < Tmp_L$$

wherein $T(i)_H$ and $T(i)_L$ are values obtained by normalizing upward pulse duration and downward pulse duration of a unit pulse in a position i counted from a first unit pulse of the included pulse train on the basis of a base clock width.

(6) An optical recording method according to the above (5), wherein the overwriting is effected at a linear velocity of at least 3.5 m/s of the optical recording medium.

DETAILED DESCRIPTION OF THE INVENTION

Figure 1:
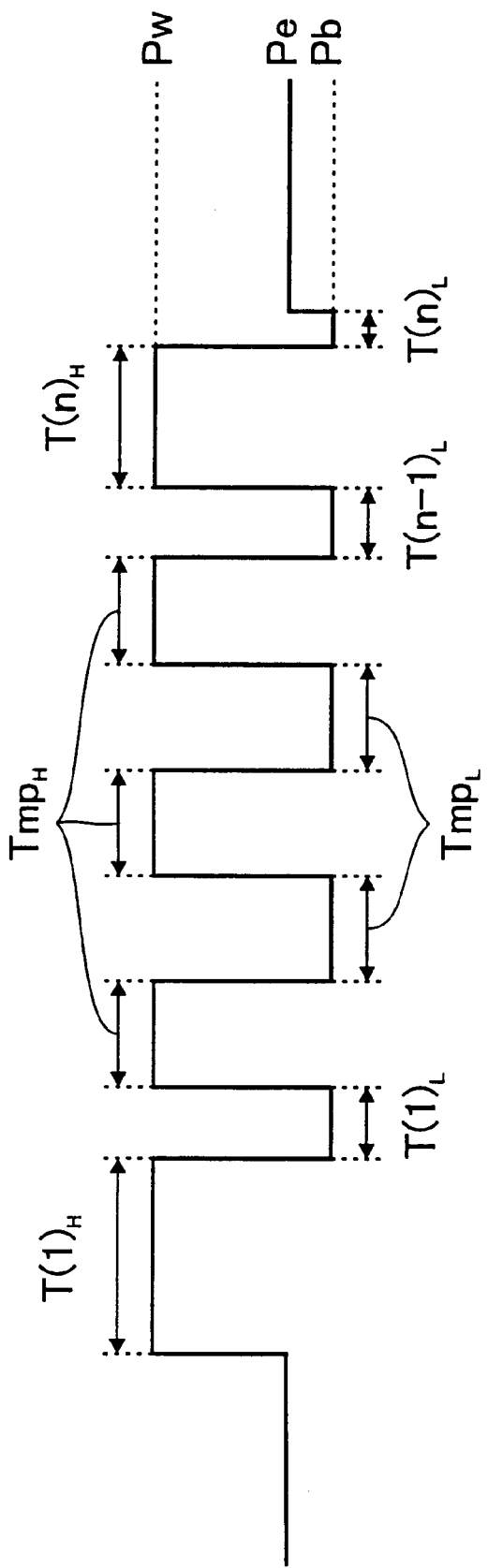
FIG. 1 schematically shows a waveform in the present invention.

As already described, when the linear velocity is relatively low, the record mark length can be considerably accurately controlled by applying laser beam like pulses. As described before, however, when the pulse-division method described in the above Japanese patent gazettes is used, it comes to be difficult to control the record mark length accurately as the linear velocity is increased, so that the jitter is not controlled to be small. Nevertheless, an increase in the jitter can be prevented by increasing the laser beam power as the linear velocity increases.

On the basis of the above-found problems, it is considered that an increase in the jitter at an increased linear velocity is caused by the following. Since the moving rate of a laser beam increases, an amount of heat accumulated in the recording layer of a medium during the application of a laser beam at a recording power level is deficient. Further, the erasing of a record mark is insufficient due to a deficiency of heat in amount during the application of laser beam at an erasing power level.

In the present invention for overcoming the above problems, a recording waveform, i.e., a signal pattern for modulating a laser beam for overwriting is controlled, so that an increase in the jitter is controlled without increasing the laser power. The method of controlling the recording waveform in the present invention will be explained hereinafter.

FIG. 1 shows an example of the recording waveform in the present invention. The recording waveform is used for forming 1 record mark by overwriting and is constituted of a pulse train. In FIG. 1, Pw shows a recording power level, Pe shows an erasing power level, and Pb shows a bottom power level. The pulse train is structured by repeating a combination of an upward pulse and a downward pulse (the combination is referred to as "unit pulse" in the present specification), and the pulse train rises from Pe and returns to Pe.

The pulse duration in the present specification refers to a normalized pulse duration obtained by normalization on the basis of a base clock width. When the linear velocity is changed, but when the modulation method is not changed, the base clock width is changed in inverse proportion to the linear velocity, so that an actual mark length comes to be constant without relying on the linear velocity so long as the record mark is formed on the basis of an identical signal. For example, when the linear velocity is decreased to ½, the base clock width is increased to be double.

In the present invention, in a pulse train having unit pulses in the number of n, an upward pulse duration and a downward pulse duration of a unit pulse in a position i counted from the first unit pulse are normalized on the basis of a base clock width, and values obtained by the above normalization are expressed as $T(i)_H$ and $T(i)_L$.

In first to third embodiments of the present invention to be explained hereinafter, in a pulse train having at least 4 unit pulses, $T(i)_H$ is determined to be a constant value when $2 \leq i \leq n-1$, and the constant value is expressed as $Tmp_H$. Further, $T(i)_L$ is determined to be a constant value when $2 \leq i \leq n-2$, and the constant value is expressed as $Tmp_L$.

The first embodiment of the present invention uses $$0 < T(1)_L < Tmp_L.$$

In the first embodiment, $T(n)_H$, $T(n-1)_L$ and $T(n)_L$ are not limited. There may be employed a constitution in which $T(n)_H = Tmp_H$ and $T(n-1)_L = T(n)_L = Tmp_L$, or a constitution in which $T(n)_H \neq Tmp_H$ and $T(n-1)_L \neq Tmp_L$ or $T(n)_L \neq Tmp_L$. Preferably, however, $T(n)_H$, $T(n-1)_L$ and $T(n)_L$ are values which satisfy the second and third embodiments to be described later.

In the first embodiment, $T(1)_L$ is limited to the above range for increasing the amount of heat in the leading edge region of a record mark. In the leading edge region of a record mark, the laser power transits from the erasing power Pe to the recording power Pw, and if the energy applied to the leading edge region of a record mark is deficient, the leading edge region comes to have a narrower mark width. As a result, a noise increases, and the jitter increases. It has been already proposed to increase the time length for upward pulse application in the first unit pulse [corresponding to $T(1)_H$] for increasing the energy to be applied to the leading edge region of a record mark. According to studies made by the present inventors, however, when the first upward pulse is simply extended in the forward direction, a record mark is lengthened more than necessary, which causes a noise, so that, in no case, the jitter can be remarkably decreased. In the first embodiment of the present invention, there is employed a constitution in which the first upward pulse is shifted toward a second upward pulse so that the energy to be applied to the leading edge region of a record mark is increased without increasing the record mark length unnecessarily. As a result, the jitter can be remarkably decreased.

However, as $T(1)_L$ comes close to 0, the cooling comes to be insufficient, so that the pulse application effect decreases. Therefore, preferably, $$0.15 \leq T(1)_L,$$

and more preferably, $$0.25 \leq T(1)_L.$$

Further, for full exhibition of an effect produced by decreasing the duration of $T(1)_L$, preferably, $$T(1)_L \leq Tmp_L - 0.1,$$

and more preferably $$T(1)_L \leq Tmp_L - 0.15.$$

The second embodiment of the present invention uses $$0 \leq T(n)_L < Tmp_L,$$

and $$Tmp_H < T(n)_H \leq Tmp_H + 0.3.$$

In the second embodiment of the present invention, $T(n)_L$ and $T(n)_H$ are limited to the above ranges, for increasing the amount of energy to be applied to the trailing edge region of a record mark. In an optical recording medium of phase change type for high-density recording, a downward pulse (sometimes called "cooling pulse") is provided after a last upward pulse in many cases, for preventing the turbulence of form of the backward end of a record mark. It has been general practice to employ a constitution in which the cooling pulse duration [$T(n)_L$ in the present invention] is equivalent to, or larger than, $Tmp_L$. When $T(n)_L \geq Tmp_L$ in a high linear velocity medium, the power necessary for erasing in the trailing edge region of a record mark is insufficient, and the erasing (crystallization) of an amorphous record mark written previously is insufficient. As a result, the jitter increases. In contrast, in the second embodiment of the present invention, not only the duration of the cooling pulse duration $T(n)_L$ is made smaller than $Tmp_L$, but also the duration of the last upward pulse duration $T(n)_H$ is made larger than the duration $Tmp_H$ of an upward pulse positioned before it, whereby the deficiency of cooling in the trailing edge region of a record mark is overcome. In this manner, an increase in the jitter, caused by the deficient erasing during overwriting at a high linear velocity is prevented. However, if the duration of $T(n)_H$ is too large, the record mark is too long, and the jitter is increased. The upper limit of $T(n)_H$ is therefore provided as described above.

Preferably, $$T(n)_L \leq 0.3.$$

Preferably, $T(n)_L = 0$, since the recording waveform can be simplified. Further, $T(n)_H$ is preferably in the following range.

$$Tmp_H + 0.1 \leq T(n)_H \leq Tmp_H + 0.2$$

The third embodiment of the present invention uses $$0 \leq T(n)_L < Tmp_L,$$

and $$0.1 \leq T(n-1)_L \leq Tmp_L.$$

In the third embodiment, $T(n)_L$ and $T(n-1)_L$ are limited to the above ranges for increasing the amount of energy to be applied to the trailing edge region of a record mark like the second embodiment. The reason for the limitation of $T(n)_L$ and a preferred range thereof are the same as those described with regard to the second embodiment. $T(n-1)_L$ is a duration of a downward pulse between the last upward pulse and an upward pulse immediately before it. When the duration of $T(n-1)_L$ is made smaller than the duration of a downward pulse before it, the amount of energy in the trailing edge region of a mark can be increased. When this decreased duration is employed together with decreased duration of $T(n)_L$, the erasing ratio in the trailing edge region of a mark can be improved, and the jitter can be decreased. Preferably, $$T(n-1)_L \leq Tmp_L - 0.05.$$

However, when the duration of $T(n-1)_L$ is made too small, the cooling is deficient and a record mark is caused to be tumid, so that $T(n-1)_L$ is determined to be at least 0.1, preferably at least 0.2.

In the present invention, at least two embodiments out of the above embodiments may be combined. The jitter can be further decreased by combining a plurality of the above embodiments.

In the above embodiments, $T(i)_H$ and $T(i)_L$ in most unit pulses are determined to be constant. That is because the complication of a pulse control circuit can be avoided. That is, in the present invention, the jitter can be decreased without complicating a pulse control circuit.

In the above embodiments, the ratio of durations of upward pulses in a unit pulse where $T(i)_H$ and $T(i)_L$ are constant, i.e., a unit pulse duty ratio $Tmp_H/(Tmp_H+Tmp_L)$, is preferably 0.4 to 0.7. Since the present invention is applied to overwriting at a high linear velocity, an increase in the laser power necessary for the overwriting is prevented by determining the above duty ratio to be relatively large.

In the above embodiments, in a unit pulse where $T(i)_H$ and $T(i)_L$ are constant, preferably, $$Tmp_H + Tmp_L = 1.$$

When the unit pulse duration ($Tmp_H+Tmp_L$) is determined to be 1, the constitution of a pulse control circuit can be simplified.

The first upward pulse is a pulse rising from the erasing power Pe. If the duration $T(1)_H$ of the first upward pulse is made equivalent to the duration $Tmp_H$ of other upward pulse, an increase in the temperature of a recording layer is liable to be insufficient. Therefore, preferably, $$T(1)H > Tmp_H,$$

and more preferably, $$T(1)H \geq Tmp_H + 0.3.$$

As described, for example, in JP-A-9-7176, a downward pulse having a lower power level than the erasing power may be provided immediately before the first upward pulse.

In the above embodiments, when a recording waveform has a pulse train in which the number n of unit pulses is 3 or less, i.e., when it is a minimum-length waveform, there may be employed a constitution in which $T(1)_H$ and $T(1)_L$ are the same as $T(1)_H$ and $T(1)_L$ in a pulse train in which $n \geq 4$, $T(2)_H$ and $T(2)_L$ are the same as $T(n-1)_H$ and $T(n-1)_L$ in the pulse train in which $n \geq 4$, and $T(3)_H$ and $T(3)_L$ are the same as $T(n)_H$ and $T(n)_L$ in the pulse train in which $n \geq 4$.

In the present invention, the duration of a waveform for forming a record mark having a signal length nT (n is a natural number and T is a base clock width) is not required to be nT. When the laser application time is nT, the length of a record mark in the track direction sometimes comes to be too large, so that the duration of a recording waveform is made smaller than the length of an actual signal.

Power levels of the pulses will be explained below. The power level (Pb in FIG. 1) of a downward pulse in the last unit pulse is always set at a level lower than the erasing power Pe. In FIG. 1, the power levels of the other downward pulses are also shown as Pb, while the other downward pulses may have level(s) other than Pb. For example, the other downward pulses may have a level equivalent to Pe. For avoiding the impairment of the effect of the downward pulses, preferably, the power levels of the downward pulses do not exceed Pe, and they are preferably below the Pe level, particularly preferably the Pb level. However, the power levels of the downward pulses are required to be higer than 0, for applying tracking servo. Further, concerning the upward pulses, the power levels of all the upward pulses may be the same, or their power levels may be different as required.

The present invention particularly produces a high effect when the erasing power Pe has a relatively low level. If the erasing power Pe is high, when the erasing power is applied after the last unit pulse, the trailing edge of a record mark is liable to be erased with conducted heat, and as a result, the jitter may increase. For preventing the above phenomenon, the erasing power Pe is adjusted preferably to 50% or smaller, more preferably to 40% or smaller, of the recording power Pw, and for preventing an insufficient erasing, the erasing power Pe is adjusted preferably to at least 10%, more preferably at least 20%, of the recording power Pw.

The present invention provides a recording method optimized for overwriting at a high linear velocity. The linear velocity at which the present invention produces its effect is preferably at least 3.5 m/s, more preferably at least 5.0 m/s, still more preferably at least 7.0 m/s.

The present invention can be applied to general optical recording media of phase change type, and is particularly suitable for use with media having a recording layer formed of a Ge—Sb—Te-based composition or an In—Ag—Te—Sb-based composition.

As a Ge—Sb—Te-based composition, preferred is a composition of the formula I which is an expression of an atomic ratio of elements as components, $$Ge_aSb_bTe_{1-a-b} \qquad (I)$$

wherein:

$0.08 \leq a \leq 0.25$ $0.20 \leq b \leq 0.40$.

As an In—Ag—Te—Sb-based composition, preferred is a composition of the formula II which is an expression of an atomic ratio of elements as components, $$[(In_aAg_bTe_{1-a-b})_{1-c}Sb_c]_{1-d}M_d$$

wherein:

$a$=0.1 to 0.3, $b$=0.1 to 0.3, $c$=0.5 to 0.8, and $d$=0 to 0.10. \qquad (II)

In the above formula (II), M is at least one element selected from H, Si, C, V, W, Ta, Zn, Ti, Ce, Tb, Ge, Sn, Pb or Y.

EXAMPLES

There was prepared a land-groove double spiral disc-shaped polycarbonate substrate having a diameter of 120 mm and a thickness of 0.6 mm and having grooves (width 0.2 μm, depth 20 nm, pitch 0.74 μm) by injection molding. The grooves were formed concurrently with the injection molding. A first dielectric layer, a recording layer, a second dielectric layer, a reflection layer and a protective layer were consecutively formed on a surface of the above substrate by the following procedures, to obtain an optical recording disc sample.

The first dielectric layer was formed in an Ar atmosphere by a sputtering method using ZnS (85 mol %)-SiO$_2$ (15 mol %) as a target. The first dielectric layer had a thickness of 88 nm.

The recording layer was formed by a sputtering method. A target had a composition of $$(In_aAg_bTe_{1-a-b})_{1-c}Sb_c$$

in which:

$a$=0.1, $b$=0.15, and $c$=0.6.

The recording layer had a thickness of 23 nm.

The second dielectric layer was formed in an Ar atmosphere by a sputtering method using ZnS (85 mol %)-SiO$_2$ (15 mol %) as a target. The second dielectric layer had a thickness of 20 nm.

The reflection layer was formed in an Ar atmosphere by a sputtering method. Al-1.7 at % Cr was used as a target. The reflection layer had a thickness of 100 nm.

The protective layer was formed by applying an ultraviolet-curable resin by a spin coating method and curing the resin under irradiation with ultraviolet light. The cured protective layer had a thickness of 5 μm.

Samples prepared in the above manner were initialized with a bulk eraser. Then, overwriting was carried out with an optical recording medium evaluator. The overwriting conditions were as follows.

Laser wavelength: 635 nm

NA: 0.6

Recording signal: 8–16 modulation signals (shortest signal 3T, longest signal 14T)

Smallest mark length: 0.40 μm

Recording power Pw: 13.0 mW

Erasing power Pe: 4.5 mW
Bias Power Pb: 0.5 mW
Linear velocity: 3.5 m/s, 5.0 m/s, 7.0 m/s
Table 1 shows a clock frequency and a first upward pulse duration $T(1)_H$ in each linear velocity.

TABLE 1

| Linear velocity (m/s) | Clock frequency (MHz) | $T(1)_H$ |
|---|---|---|
| 3.5 | 26.16 | 1.0 |
| 5.0 | 37.37 | 0.9 |
| 7.0 | 52.32 | 0.8 |

Recording waveforms for the overwriting were set as shown in Tables 2 to 4. In the above manner, the overwriting was repeated 10 times, reproduced signals were measured with a time interval analyzer, a window width was taken as Tw, and a clock jitter was calculated on the basis of σ/Tw (%).

Table 2 shows a change in clock jitter when $T(1)_L$ was changed, Table 3 shows a change in clock jitter when $T(n)_L$ and $T(n)_H$ were changed, and Table 4 shows a change in clock jitter when $T(n)_L$ and $T(n-1)_L$ were changed. $T(1)_H$ was changed depending upon a linear velocity as shown in Table 1, and the other pulse durations were fixed at values shown in Tables. Further, in 3T signals in which the number of pulse trains is 3 or less, $T(i)_H$ and $T(i)_L$ were set according to signals in which n≧4.

TABLE 2

Relationship between $T(1)_L$ and clock jitter
(in which $Tmp_H = Tmp_L = T(n-1)_L = T(n)_H = 0.5\ T(n)_L = 0$)

| | | Clock Jitter (%) | | |
|---|---|---|---|---|
| Condition No. | $T(1)_L$ | Linear velocity 3.5 m/s | Linear velocity 5.0 m/s | Linear velocity 7.0 m/s |
| 101 | 0* | 13.63 | 13.43 | 14.80 |
| 102 | 0.1 | 8.55 | 9.28 | 11.30 |
| 103 | 0.2 | 8.42 | 8.95 | 10.26 |
| 104 | 0.3 | 8.45 | 8.66 | 9.92 |
| 105 | 0.4 | 8.55 | 8.77 | 10.59 |
| 106 | 0.5* | 8.61 | 9.40 | 12.14 |
| 107 | 0.6* | 8.94 | 9.68 | 12.22 |
| 108 | 0.7* | 9.29 | 10.36 | 12.55 |

*outside the limited range

TABLE 3

Relationship of $T(n)_L$ and $T(n)_H$ with clock jitter
(in which $T(1)_H = Tmp_H = Tmp_L = T(n-1)_L = 0.5$)

| | | | Clock jitter (%) | | |
|---|---|---|---|---|---|
| Condition No. | $T(n)_L$ | $T(n)_H$ | Linear velocity 3.5 m/s | Linear velocity 5.0 m/s | Linear velocity 7.0 m/s |
| 201 | 0 | 0.3* | 9.32 | 10.04 | 12.25 |
| 202 | 0 | 0.4* | 9.01 | 9.89 | 12.16 |
| 203 | (106)0 | 0.5* | 8.61 | 9.40 | 12.14 |
| 204 | 0 | 0.6 | 8.55 | 9.32 | 11.93 |
| 205 | 0 | 0.7 | 8.49 | 9.28 | 11.96 |
| 206 | 0 | 0.8 | 8.50 | 9.37 | 12.12 |
| 207 | 0 | 0.9* | 8.96 | 9.77 | 12.40 |
| 208 | 0.1 | 0.5* | 8.47 | 9.32 | 12.35 |
| 209 | 0.2 | 0.5* | 8.77 | 9.54 | 12.89 |
| 210 | 0.3 | 0.5* | 9.40 | 10.19 | 13.51 |
| 211 | 0.4 | 0.5* | 10.21 | 11.35 | 13.96 |
| 212 | 0.5* | 0.5* | 11.14 | 12.44 | 14.22 |

*outside the limited range

TABLE 4

Relationship of $T(n)_L$ and $T(n-1)_L$ with clock jitter
(in which $T(1)_H = Tmp_H = Tmp_L = T(n)_H = 0.5$)

| | | | Clock jitter(%) | | |
|---|---|---|---|---|---|
| Condition No. | $T(n)_L$ | $T(n-1)_L$ | Linear velocity 3.5 m/s | Linear velocity 5.0 m/s | Linear velocity 7.0 m/s |
| 301 | 0 | 0.1 | 8.57 | 9.35 | 12.01 |
| 302 | 0 | 0.2 | 8.49 | 9.21 | 11.89 |
| 303 | 0 | 0.3 | 8.43 | 8.91 | 11.82 |
| 304 | 0 | 0.4 | 8.34 | 9.30 | 11.98 |
| 305 | (106)0 | 0.5* | 8.61 | 9.40 | 12.14 |
| 306 | 0 | 0.6* | 8.83 | 9.65 | 12.19 |
| 307 | 0 | 0.7* | 9.40 | 10.22 | 12.32 |

*outside the limited range

Tables 2 to 4 clearly show the effect of the present invention. A conventional general condition corresponds to No. 212 in Table 3. That is, it is a condition where the duration $T(1)_H$ of a first upward pulse is made longer and the durations of all the other pulses were made identical. In contrast, in Table 2, when $T(1)_L$ satisfies the first embodiment, the clock jitter is small. In Table 3, when $T(n)_L$ and $T(n)_H$ satisfy the second embodiment, the clock jitter is small. In Table 4, further, when $T(n)_L$ and $T(n-1)_L$ satisfy the third embodiment, the clock jitter is small.

Further, the clock jitters were measured while combining the conditions shown in Tables 2 to 4, and an optimum condition was found to be a combination of $T(1)_L = 0.25$, $T(n-1)_L = 0.45$, $T(n)_H = 0.80$, and $T(n)_L = 0$ Under the above condition, the clock jitters were as follows.

Linear velocity 3.5 m/s: 8.22%

Linear velocity 5.0 m/s: 8.45%

Linear velocity 7.0 m/s: 9.66%

Effect of the Invention

In the present invention, a recording waveform is controlled when overwriting is made in an optical recording medium at a high linear velocity, whereby the insufficiency of application power in leading edge and trailing edge regions of a record mark can be overcome without increasing the power of a laser beam. As a result, an increase in the jitter can be prevented.

What is claimed is:

1. An optical recording method using a pulse train having at least 1 unit pulse of an upward pulse and a downward pulse continued therefrom as a recording waveform for optical beam modulation in forming 1 record mark by overwriting in an optical recording medium having a recording layer of a phase change type on a substrate, the pulse train including a pulse train having unit pulses of which the number is n ($n \geq 4$), the optical recording method satisfying;

$T(i)_H = Tmp_H$ (constant value) when $2 \leq i \leq n-1$, $T(i)_L = Tmp_L$ (constant value) when $2 \leq i \leq n-2$, and $0 < T(1)_L < Tmp_L$ wherein $T(i)_H$ and $T(i)_L$ are values obtained by normalizing upward pulse duration and downward pulse duration of a unit pulse in a position i counted from a first unit pulse of the included pulse train on the basis of a base clock width.

2. An optical recording method according to claims 1, wherein the overwriting is effected at a linear velocity of at least 3.5 m/s of the optical recording medium.

3. An optical recording method using a pulse train having at least 1 unit pulse of an upward pulse and a downward pulse continued therefrom as a recording waveform for optical beam modulation in forming 1 record mark by overwriting in an optical recording medium having a recording layer of a phase change type on a substrate, the pulse train including a pulse train having unit pulses of which the number is n ($n \geq 4$), the optical recording method satisfying;

$T(i)_H = Tmp_H$ (constant value) when $2 \leq i \leq n-1$, $T(i)_L = Tmp_L$ (constant value) when $2 \leq i \leq n-2$, $0 \leq T(n)_L < Tmp_L$, and $Tmp_H < T(n)_H \leq Tmp_H + 0.3$ wherein $T(i)_H$ and $T(i)_L$ are values obtained by normalizing upward pulse duration and downward pulse duration of a unit pulse in a position i counted from a first unit pulse of the included pulse train on the basis of a base clock width.

4. An optical recording method according to claims 3, wherein the overwriting is effected at a linear velocity of at least 3.5 m/s of the optical recording medium.

5. An optical recording method using a pulse train having at least 1 unit pulse of an upward pulse and a downward pulse continued therefrom as a recording waveform for optical beam modulation in forming 1 record mark by overwriting in an optical recording medium having a recording layer of a phase change type on a substrate, the pulse train including a pulse train having unit pulses of which the number is n ($n \geq 4$), the optical recording method satisfying;

$T(i)_H = Tmp_H$ (constant value) when $2 \leq i \leq n-1$, $T(i)_L = Tmp_L$ (constant value) when $2 \leq i \leq n-2$, $0 \leq T(n)_L < Tmp_L$, and $0.1 \leq T(n-1)_L < Tmp_L$ wherein $T(i)_H$ and $T(i)_L$ are values obtained by normalizing upward pulse duration and downward pulse duration of a unit pulse in a position i counted from a first unit pulse of the included pulse train on the basis of a base clock width.

6. An optical recording method according to claims 5, wherein the overwriting is effected at a linear velocity of at least 3.5 m/s of the optical recording medium.

* * * * *